March 10, 1936.          G. C. PAHLOW ET AL          2,033,445
ARM HOOK-UP FOR CASKET HANDLES
Filed March 11, 1935
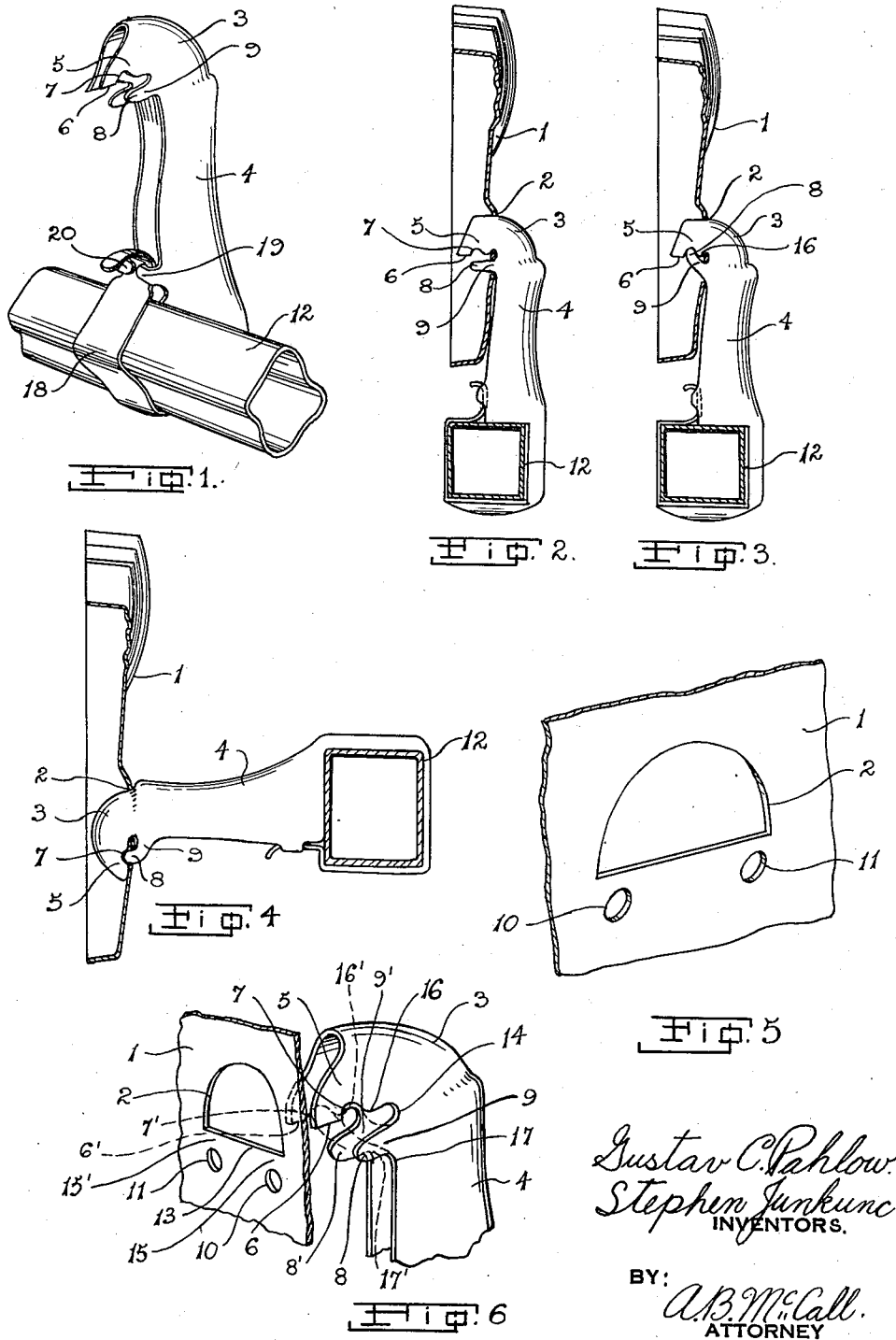

Patented Mar. 10, 1936

2,033,445

UNITED STATES PATENT OFFICE 2,033,445

ARM HOOK-UP FOR CASKET HANDLES

Gustav C. Pahlow, Galesburg, and Stephen Junkunc, Oak Park, Ill., assignors to Victor Casket Hardware Company, Galesburg, Ill.

Application March 11, 1935, Serial No. 10,482

1 Claim. (Cl. 16—112)

Our invention relates to casket handles and mountings therefor, and more particularly to improvements in the casket handle arm and its supporting lug, and has for an object the improvements providing a more successful clinching of the holding fingers and a more quiet manipulation of the handle and arms in use.

A further object of our invention is to provide improvements in casket handle arms and supports which will be economical and practical to manufacture in all of the operations required to produce it, and then when made, a handle arm and handle assembly which will be quickly and easily secured to its support in a manner not easily broken and in a manner which will prevent the assembled and attached handle structure from causing any metallic clanking or other metallic noises about a casket or vault when in use.

We attain the objects of our improved device in the specification and claim which follow and in the device illustrated in the drawing, a study of which will give a better understanding of the merits thereof.

Referring to the figures:

Figure 1 is a perspective of a casket handle arm provided with our improvements.

Figure 2 is a vertical sectional view of a casket lug and one of our handle arms set into place therein but not clamped.

Figure 3 is a view similar to Figure 2 but showing the handle arm clamped into operative position and dropped down.

Figure 4 is a view similar to Figure 3 but showing the handle arm clamped to the casket handle lug and lifted.

Figure 5 is a fragmentary detail of the portion of a casket lug including the openings into which the handle arm of our invention is operatively attached.

Figure 6 is an enlarged fragmentary detail of the hinge of the attaching end of one of our handle arms and lug plate provided with our novel improvements and showing in dotted lines the bent and attached position of the clamping finger.

We are aware of the features disclosed in patents of the prior art such as Patent Number 1,420,815 and Patent Number 1,302,423 which we have carefully considered, and it is novel improvements upon casket handle arms of this general character for which we seek protection.

For instance, in an escutcheon plate 1 we prefer to provide a half circular hole 2 for the elbow or head portion 3 of our handle arm 4. By providing a half circular hole 2 entirely cut out rather than a horse shoe shape slot 8 as taught by Christian, we eliminate chances of binding between moving parts and the stationary parts when the handle arm 4 is manipulated.

A further feature of our novel improvements in casket handle arms is found in the novel design of the hook portion 5 of head or elbow 3 of arm 4 wherein there is provided along the edge 6 of this hook portion a recess 7 adapted to receive the end 8 of finger 9 after finger 9 is bent edgewise to engage recess 7.

It will be noted that a recess 7 corresponds to recess 7' on the opposite side of head 3 to receive the end 8 of a finger 9 which functions and bends simultaneously with the movement and operation of finger 9'.

It will be observed that when handle arm 4 is secured to escutcheon plate 1 the engaging fingers 9 and 9' are slipped through holes 10 and 11 of escutcheon plate 1 at the same time that hook portion 5 of head 3 is inserted through half-round hole 2 in that plate as shown in a position previous to the insertion in Figure 6 as an enlarged fragmentary detail.

After the hook portion 5 and fingers 9 and 9' are inserted through their respective receiving and engaging holes in plate 1 then the operator will lift handle 12 raising handle arm 4 causing fingers 9 and 9' to bend edgewise, bringing the finger tips 8 and 8' into their respective recesses 7 and 7'.

This bending operation is thus produced by the pivotal lifting movement of the hook portion 5 of head 3 in arm 4 about the supporting portion 13 of plate 1 where the base or closed ends 14 and 14' of the notch cut in head 3 separates hook 5 from fingers 9 and 9'. Fingers 9 and 9' are thus bent into an arc by their pressure against the bottom edge of holes 10 and 11 respectively as the handle arm is lifted. Thus the portion 15 and 15' of integral supporting member 13 are encompassed and engaged by fingers 9 and 9' in the support of arm 4, after the arm is thus lifted in the finger bending and assembling operation.

In previous constructions it has, in practice, been difficult to avoid a metallic clank when letting loose of a handle 12 since there was apparently no structure in the design of devices in the prior art which would tend to hold a snug engagement of the escutcheon plate 1 where arm 4 was secured thereto. We have provided therefore, a means of eliminating a tendency to cause metallic sounds when handling the casket and vault handles and the like by providing adjacent recesses 7 and 7′ a protruding portion 16 and 16′ along the hook edge 6 and 6′ so that when fingers 9 and 9′ are bent into their engaging position with their tips registering up into recesses 7 and 7′; then the protruding portion 16 and 16′ as is shown assembled in Figures 3 and 4 tend to constantly and snugly rub against the supporting portions 15 and 15′ of plate 1.

The effect of the protruding portions 16 and 16′ snugly swiping supporting portions 15 and 15′ when arm 4 is secured thereto is to prevent handle 12 and arm 4 from dropping down to strike the outer face surface of lug or escutcheon plate 1 too quickly when the handle is released. Thus the fitting connection is snug and smooth in operation without the tendency to let the handle down in a dropping movement that will cause metallic clanking of metal against metal, a feature which it is desired to avoid around a funeral.

When finger tips 8 and 8′ are made to fit up into recesses 7 and 7′ the fingers 9 and 9′ are more firmly held in operating position.

We prefer, also, to provide in the blanking operation of arms 4 a curve 17 and 17′ in the base of fingers 9 and 9′ to prevent these fingers from breaking off easily.

It will be noted that in the handle supporting ends of arms 4 the arm is blanked out in a manner permitting the strap portion 18 to be bent around handle 12 where it is engaged by cleats 19 and 20, and it will also be understood that we do not wish to be confined to any particular style of handle bar 12; it being immaterial whether the handle bar is round, square, polygonal, fluted, or corrugated.

Having thus described the nature of our improvements and set forth the features which we regard as novel over the existing art, what we claim is:

A casket handle arm formed of sheet metal defining a curved body bent to form a hook at one end, and formed at the other for receiving and engaging a casket handle, said hooked end notched out on each side adjacent the terminal hook portion to define an integral flanking finger curved in its juncture with the adjacent flank of the arm; said hook adjacent the notch on each side shaped to receive the terminal of said fingers when the finger is bent edgewise and said hook adjacent said notch provided with a protrusion of its edge within the notch.

GUSTAV C. PAHLOW.
STEPHEN JUNKUNC.